(12) United States Patent
Feller

(10) Patent No.: US 9,618,372 B2
(45) Date of Patent: Apr. 11, 2017

(54) TRANSIT TIME FLOW METER PROBE

(71) Applicant: Onicon Inc., Clearwater, FL (US)

(72) Inventor: Murray F Feller, Micanopy, FL (US)

(73) Assignee: Onicon Inc., Largo, FL (US)

( * ) Notice: Subject to any disclaimer, the term of this patent is extended or adjusted under 35 U.S.C. 154(b) by 38 days.

(21) Appl. No.: 14/845,426

(22) Filed: Sep. 4, 2015

(65) Prior Publication Data
US 2017/0067766 A1 Mar. 9, 2017

(51) Int. Cl.
*G01F 1/66* (2006.01)

(52) U.S. Cl.
CPC ..................... *G01F 1/66* (2013.01)

(58) Field of Classification Search
None
See application file for complete search history.

(56) References Cited

U.S. PATENT DOCUMENTS

| | | | | |
|---|---|---|---|---|
| 4,467,659 A * | 8/1984 | Baumoel | ................. | G01F 1/662 310/366 |
| 6,178,827 B1 * | 1/2001 | Feller | ..................... | G01F 1/662 73/861.22 |
| 6,508,134 B1 * | 1/2003 | Feller | ........................ | G01F 5/00 73/861.22 |
| 6,973,842 B1 | 12/2005 | Feller | | |
| 7,252,015 B2 * | 8/2007 | Konzelmann | ........... | G01F 1/662 73/861.25 |
| 7,287,436 B2 * | 10/2007 | Lang | ........................ | G01F 5/00 73/861.25 |
| 7,380,470 B2 * | 6/2008 | Konzelmann | ........... | G01F 15/00 73/861.25 |
| 7,568,398 B2 | 8/2009 | Feller | | |
| 7,841,243 B1 * | 11/2010 | Feller | ..................... | G01B 17/00 73/861.27 |
| 7,987,732 B2 * | 8/2011 | Konzelmann | ........... | G01F 1/662 73/861.25 |
| 8,256,076 B1 | 9/2012 | Feller | | |
| 8,516,901 B2 * | 8/2013 | Kroemer | ................. | G01F 1/662 73/861.25 |
| 9,027,414 B2 * | 5/2015 | Satou | ...................... | G01F 1/662 73/861.28 |
| 2001/0015107 A1 * | 8/2001 | Feller | ..................... | G01F 1/662 73/861.27 |
| 2006/0156829 A1 * | 7/2006 | Konzelmann | ........... | G01F 15/00 73/861.27 |
| 2009/0178490 A1 * | 7/2009 | Konzelmann | ........... | G01F 1/662 73/861.29 |
| 2013/0167655 A1 * | 7/2013 | Fujii | ..................... | G01F 15/185 73/861.27 |

* cited by examiner

*Primary Examiner* — Harshad R Patel
(74) *Attorney, Agent, or Firm* — David Kiewit

(57) ABSTRACT

A transit time flow sensor is configured as an insertable probe carrying a pair of transducers spaced apart along an acoustic path. The transducers are attached to respective tabs extending outwardly from the ends of a tubular member and skewed with respect to an axis of the tube so that acoustic signals from one of the transducers are reflected from an interior portion of the tube and subsequently detected by the other transducer.

13 Claims, 3 Drawing Sheets

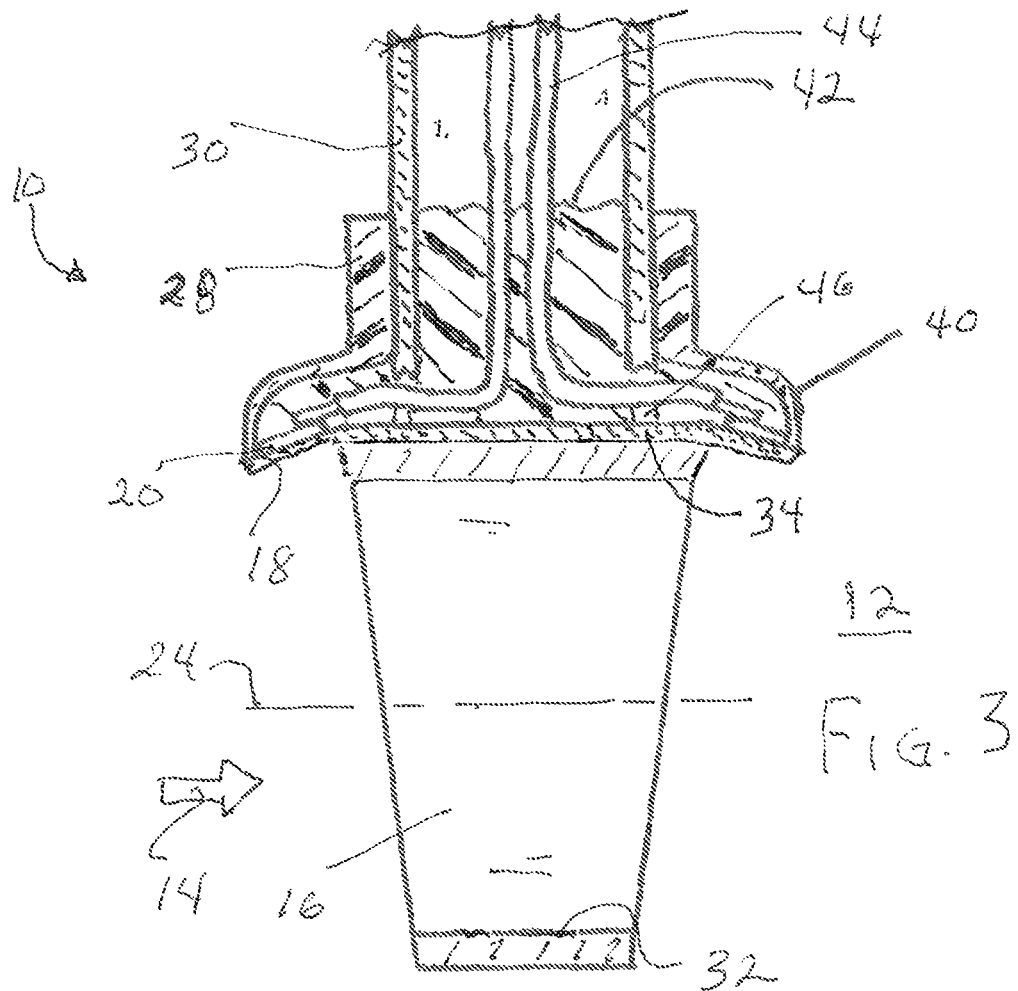
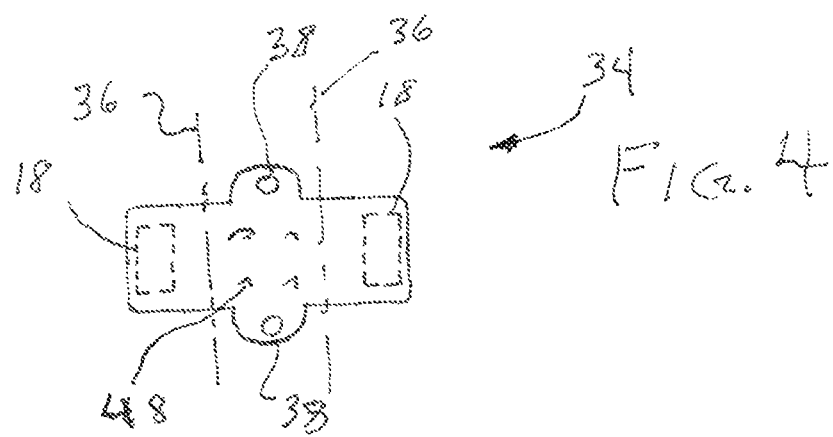

TRANSIT TIME FLOW METER PROBE

BACKGROUND OF THE INVENTION

The present disclosure relates to devices for determining the rate of flow of a fluid by means of an acoustic transit time measurement.

More specifically, the present invention relates to a transit time flow sensor configured as an insertable probe carrying two or more transducers spaced apart along an acoustic path. Sensing devices of this sort have been described by the inventor in his U.S. Pat. No. 6,973,842, the disclosure of which is hereby incorporated by reference.

BRIEF SUMMARY OF THE INVENTION

One aspect of the invention is that it provides a transit-time flow metering probe insertable into a fluid flowing along a flow direction. A preferred probe comprises a (preferably metallic) tubular portion, a pair of transducer mounting tab portions and a pair of transducers attached to respective tabs. In preferred embodiments the tubular portion comprises an interior portion configured as an acoustic reflector. In these embodiments each of the tab portions has a wettable face proximal an axis of the tubular portion and a parallel environmentally sealed face distal therefrom. Each of these tab portions is skewed with respect to the axis by a respective angle selected so that the wettable surfaces of the tab portions and the acoustic reflector portion define an acoustic path for signals generated by the transducers affixed to respective sealed surfaces of associated mounting tab portions.

Another aspect of the invention is that it provides a transit-time flow metering probe comprising a metallic tubular portion having a pair of transducer mounting tab portions extending outwardly from two ends thereof. This flow meter probe also comprises a pair of transducers attached to respective tabs skewed with respect to the axis by a respective angle selected so that wettable surfaces of the tab portions and the acoustic reflector portion define an acoustic path for signals generated by the transducers affixed to respective sealed surfaces of associated mounting tab portions.

Yet another aspect of the invention is that it provides a transit-time flow metering probe comprising a metallic tubular portion having affixed thereto a thin metal sheet providing a pair of transducer mounting tab portions extending outwardly from two ends of the tubular portion. This flow meter probe also comprises a pair of transducers attached to respective tabs skewed with respect to the axis by a respective angle selected so that wettable surfaces of the tab portions and the acoustic reflector portion define an acoustic path for signals generated by the transducers affixed to respective sealed surfaces of associated mounting tab portions.

Those skilled in the art will recognize that the foregoing broad summary description is not intended to list all of the features and advantages of the invention. Both the underlying ideas and the specific embodiments disclosed in the following Detailed Description may serve as a basis for alternate arrangements for carrying out the purposes of the present invention and such equivalent constructions are within the spirit and scope of the invention in its broadest form. Moreover, different embodiments of the invention may provide various combinations of the recited features and advantages of the invention, and that less than all of the recited features and advantages may be provided by some embodiments.

BRIEF DESCRIPTION OF THE SEVERAL VIEWS OF THE DRAWING

FIG. 3 is an axial cross-sectional view, similar to that of FIG. 2, of a second embodiment of the invention.

FIG. 4 is a plan view of a thin foil member used as a transducer mounting tab in the second embodiment.

DETAILED DESCRIPTION OF A PREFERRED EMBODIMENT

Figure 1:
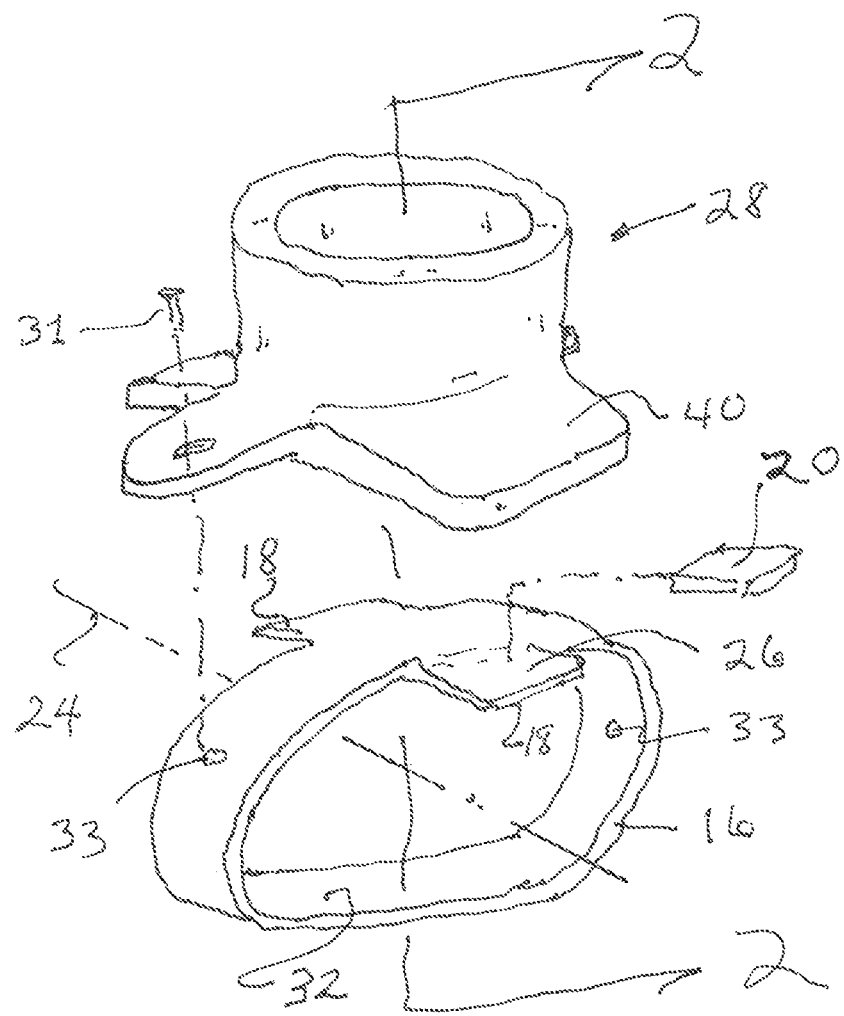
FIG. 1 is a partial exploded view of a first embodiment of the invention.

In studying this Detailed Description, the reader may be aided by noting definitions of certain words and phrases used throughout this patent document. Wherever those definitions are provided, those of ordinary skill in the art should understand that in many, if not most, instances such definitions apply both to preceding and following uses of such defined words and phrases.

As noted above and schematically depicted in FIG. 2, one aspect of the invention is that it provides a transit-time flow metering probe 10 insertable into a fluid 12 flowing along a flow direction 14. Preferred embodiments of such a probe comprise a (preferably metallic) tubular portion 16, a pair of transducer mounting tab portions 18 and a pair of transducers 20 attached to respective tabs and communicating with each other along an acoustic path 22.

Turning now to FIG. 1, one finds a partial exploded view of an embodiment of a flow metering probe of the invention. In use, a tubular portion 16 of the probe is aligned so that its axis 24 is parallel to a flow direction 14. The tubular portion 16 has a respective tab portion 18 extending outwardly from each of its ends. A respective ultrasonic transducer 20, which is preferably a thin rectangular piezoelectric ceramic, is bonded to an outer, non-wettable, surface 26 of the associated tab (one of the transducers is omitted from FIG. 1 in the interest of clarity of presentation). A sealing member 28 is attached to the tubular portion of the probe so as to environmentally seal the transducers from whatever fluid is to be measured. A probe stem 30, as depicted in FIG. 2 and FIG. 3, is connected to the sealing member 28 to mechanically support the probe head.

In the depiction of FIG. 1 the sealing member 28 is connected to the tubular member 16 by means of a pair of screws 31 (only one of which is shown) cooperating with tapped holes 33. The reader should note that this fastening arrangement was used for experimental convenience and that any of a variety of suitable approaches, comprising, but not limited to, riveting, using self-tapping screws, and spot welding could be used to connect the sealing and tubular members.

Figure 2:
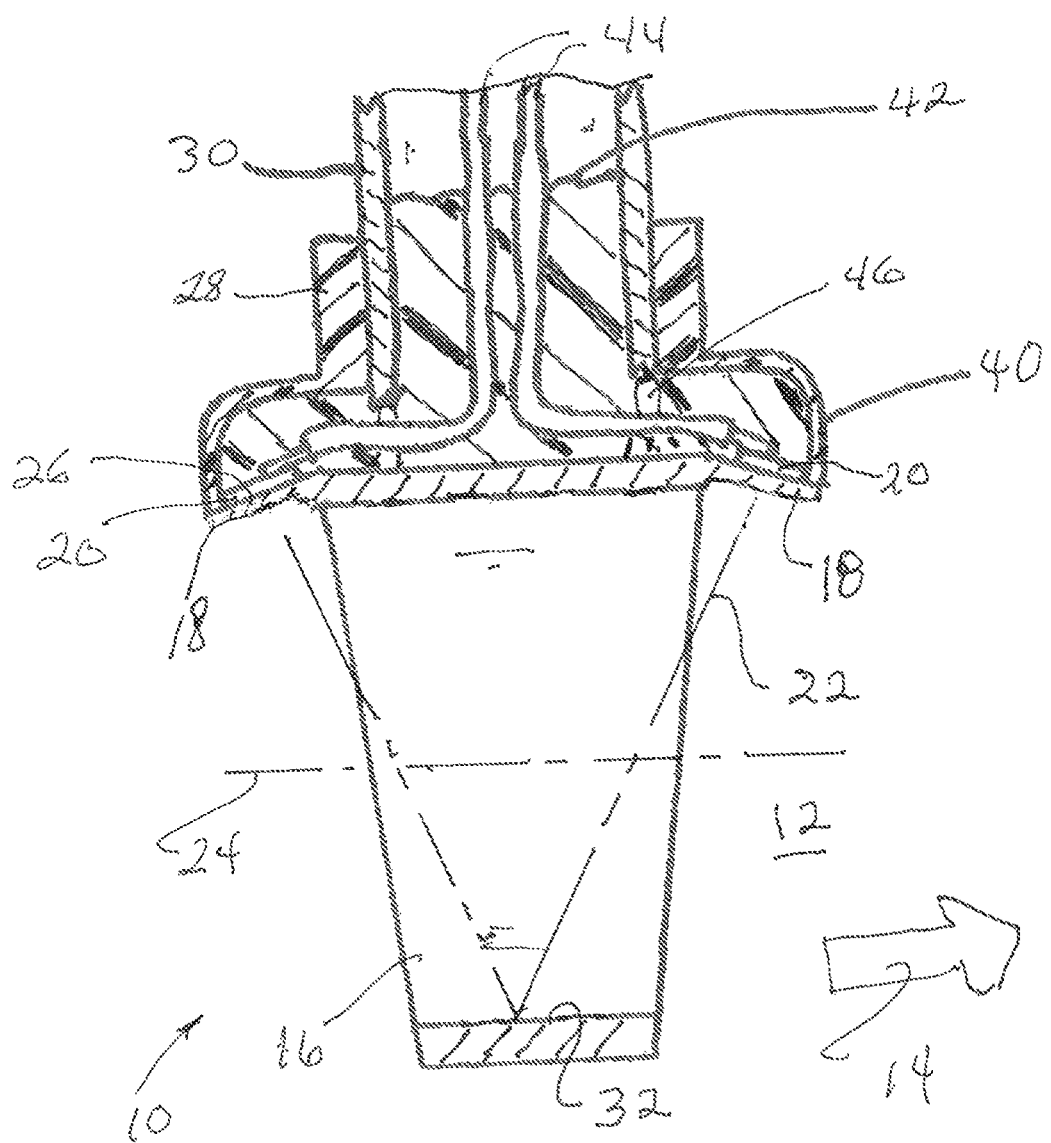
FIG. 2 is an axial cross-sectional view of the embodiment of FIG. 1, the view taken as indicated by the double headed arrow 2-2 in FIG. 1.

An acoustic path 22, schematically indicated in FIG. 2, for transit time flow measurement is preferably provided by skewing the tabs 18 with respect to the axis 24 of the tubular portion by an angle selected so that an acoustic signal emitted by one of the transducers is reflected from an internal wall 32 of the tubular member and received by the other transducer. The acoustic reflector portion of the inside surface 32 may be provided by various means. These comprise, but are not limited to: machining the tubular portion from a block of metal with a flattened, reflective portion; selectively deforming a cylindrical tubular portion; and using a tubular portion having a rectangular cross-section. In tested embodiments both tabs were skewed by roughly the same angle so as to yield a symmetrical acoustic path. The reader will appreciate that this was a matter of convenience and that embodiments of the invention embrace somewhat asymmetrical paths associated with disparate bend angles.

In a first embodiment, depicted in FIGS. 1 and 2, the tab portions may be formed from a wall of the tubular portion by a suitable operation, such as machining, and then bent about a line perpendicular to the axis into a suitable orientation to define the acoustic beam 22. In this embodiment the transducer 20 is bonded onto a surface of the tab 18 distal from the tube axis 24 (also referred to as the non-wettable, outer or sealed surface) so that the tab provides an acoustic window having an inner, wettable surface in contact with the flowing fluid when the apparatus is in operation. The window portion of the tab is preferably made thin to reduce acoustic losses. Thus, making a first embodiment of the probe head may involve thinning at least a portion of each tab if the tube wall is relatively thick. Many sorts of approach to thinning may be considered. These include, but are not limited to conventional machining, EDM and etching. The thinning operation may be carried out either before or after the bending step. Moreover, material may be removed from only selected regions of the tab.

In a second embodiment, as shown in FIGS. 3 and 4 the tab portions 18 may be provided by one or more separate thin sheet(s) 34 of material sandwiched between the tubular portion 16 and the sealing member 28. This approach allows one to have a tab that is very thin (e.g., 0.005") and that has a thickness selected for resonant operation with available ceramic transducers operated in thickness mode. In one example of this embodiment, using a sheet 34 depicted in FIG. 4, the tab portions can be formed from a flat metal sheet by bending along the double-dotted phantom lines 36. The attachment ear portions 38 can be deformed about the long edges of the sheet so that the sheet can be captured between the sealing member and the tubular member with the holes in the sheet 34 aligned with the holes 33 in the tubular member. In another variation two separate thin sheets set perpendicular to each other were used. In this example one sheet provided the two transducer mounting tabs while the other extended between two mounting screws 31 used to strap the first sheet into place between the tubular portion 16 and the sealing member 28.

A sealing member 28 preferably connects the probe head 10 to a probe stem 30. Preferably, when a thin separate sheet 34 is used for the tab portions, the tab-covering edge portions 40 of the sealing member adjacent the transducers can provide the desired working angle for the acoustic path. That is, one can clamp the thin flexible tabs 18 to rigid edges of the tab-covering portions 40 of the sealing member 28 during the process of environmentally encapsulating the transducers, generally with a cured epoxy 42.

In an experimental trial using integrally formed tabs extending outwardly from the ends of a tubular portion a probe head was made in which the separate sealing member did not have a tab-covering portion. The bottom electrodes of the transducers were soldered to the tabs so that the tubular portion provided a common ground connection when assembled so that the tubular portion was in electrical contact with the stem. Separate insulated wires 44 attached to the transducers' top electrodes were pulled through slots 46 into a stem 30. The initially exposed transducers and leads were then environmentally sealed with an epoxy 42 that was also used to pot the leads inside the stem.

In a preferred assembly process one side of each of the transducers is metallically connected to an associated electrically conducting tab (e.g., by soldering). Lead wires 44 are then respectively connected to the second (outer) sides of the transducers. The tubular member 16, tabs 18, lead wires 44, sealing member 28 and stem 30 are then assembled. In preferred embodiments the stem 30 has two slits 46 at its inserted end so that the insulated lead wires 44 can be pulled through the stem 30. This configuration allows the inserted end of the stem to be in metallic contact with the tab portions which provides the ground contact for both transducers. The assembled unit is then clamped together and the chamber so formed is filled with an appropriate encapsulant 42.

Note that in embodiments employing thin metal foils special care is taken to assure that the foils are held against the tab-covering portions 40 of the sealing member 28 while the encapsulant 42 cures. Moreover, a preferred foil 34 is springy and may have dimples, domes, or other surface features 48 in a region contacted by the stem. This arrangement can improve reliability of the electrical ground contact between the stem and the transducer mounting tabs in that it provides a spring bias forcing the foil and stem together. This bias may be enough to overcome degradation of contact quality associated with thermal expansion mismatches, mechanical shocks, etc.

Although the present invention has been described with respect to several preferred embodiments, many modifications and alterations can be made without departing from the invention. Accordingly, it is intended that all such modifications and alterations be considered as being within the spirit and scope of the invention as defined in the attached claims.

The invention claimed is:

1. A transit-time flow metering probe insertable into a fluid flowing along a flow direction, the probe comprising:
   a tubular portion having two ends and an axis alignable parallel to the flow direction, the tubular portion comprising an acoustic reflector portion on an inside surface thereof;
   a pair of transducer mounting tab portions spaced apart along a line parallel to the axis of the tubular portion, the tab portions skewed with respect to the axis by respective angles selected so that a respective wettable surface of each of the tab portions and the acoustic reflector portion define an acoustic path; and
   a pair of transducers respectively attached to non-wettable surfaces of associated mounting tab portions, the transducers operable to transmit and receive acoustic signals propagating through the tab portions and along the acoustic path.

2. The transit-time flow metering probe of claim 1 wherein the tab portions are extensions of a wall of the tubular portion and are bent by the respective angles about respective lines perpendicular to the axis to define the acoustic path.

3. The transit-time flow metering probe of claim 1 wherein the tab portions are portions of a thin metal sheet fixedly attached to the tubular portion.

4. The transit-time flow metering probe of claim 1 further comprising a sealing member in engagement with the non-wettable surfaces of the tabs.

5. The transit-time flow metering probe of claim 1 wherein the tubular portion is metallic and provides an electrical ground for the transducers.

6. The transit-time flow metering probe of claim 1 further comprising electrically insulating encapsulant material preventing the transducers from contacting the fluid.

7. The transit-time flow metering probe of claim 1 wherein the acoustic path lies in a plane containing the axis of the tubular portion and the parallel line.

8. A transit-time flow metering probe insertable into a fluid flowing along a flow direction, the probe comprising:
 a metallic tubular portion having two ends and an axis alignable parallel to the flow direction, the tubular portion comprising an acoustic reflector portion on an inside surface thereof;
 a pair of transducer mounting tab portions extending outwardly from the tubular portion and spaced apart along a line parallel to the axis thereof, each of the tab portions having a wettable surface proximal the axis and a parallel non-wettable surface distal therefrom, each of the tab portions skewed with respect to the axis by a respective angle selected so that the wettable surfaces of the tab portions and the acoustic reflector portion define an acoustic path in a plane containing the axis of the tubular portion and the parallel line; and
 a pair of transducers respectively electrically and mechanically attached to the non-wettable surfaces of associated mounting tab portions for transmitting and receiving acoustic signals through the tab portions and along the acoustic path.

9. The transit-time flow metering probe of claim 8 wherein the tab portions are extensions of a wall of the tubular portion and are bent by the respective angles about respective lines perpendicular to the axis to define the acoustic path.

10. The transit-time flow metering probe of claim 8 wherein the tab portions comprise respective window portions thinner than other portions of the wall of the tubular portion.

11. A transit-time flow metering probe insertable into a fluid flowing along a flow direction, the probe comprising:
 a metallic tubular portion having two ends and an axis alignable parallel to the flow direction, the tubular portion comprising an acoustic reflector portion on an inner surface thereof;
 a thin metallic sheet affixed to the tubular portion so as to provide a pair of transducer mounting tab portions spaced apart along a line parallel to the axis of the tubular portion, each of the tab portions having a wettable face proximal the axis and a parallel non-wettable face distal therefrom, each of the tab portions skewed with respect to the axis by a respective angle selected so that the wettable surfaces of the tab portions and the acoustic reflector portion define an acoustic path in a plane containing the axis of the tubular portion and the parallel line; and
 a pair of transducers respectively electrically and mechanically attached to the non-wettable surfaces of associated mounting tab portions for transmitting and receiving acoustic signals through the associated tab portions and along the acoustic path.

12. The transit-time flow metering probe of claim 11 further comprising a sealing member having two tab-covering portions supporting respective tab portions at respective selected angles when the non-wettable surface of the respective tab portion is covered with an electrically insulating encapsulant.

13. The transit-time flow metering probe of claim 11 wherein the thin metallic sheet comprises at least one surface protrusion electrically contacting a wall of a metallic stem member fixedly attached to the tubular portion.

* * * * *